United States Patent [19]

Fatehi et al.

[11] Patent Number: 5,296,956
[45] Date of Patent: Mar. 22, 1994

[54] PERFORMANCE MONITORING AND FAULT LOCATION FOR OPTICAL EQUIPMENT, SYSTEMS AND NETWORKS

[75] Inventors: Mohammad T. Fatehi, Middletown; Fred L. Heismann, Freehold, both of N.J.

[73] Assignee: AT&T Bell Laboratories, Murray Hill, N.J.

[21] Appl. No.: 914,301

[22] Filed: Jul. 17, 1992

[51] Int. Cl.$^5$ ............................................. H04B 10/08
[52] U.S. Cl. ................................. 359/110; 371/29.5; 340/825.07
[58] Field of Search ............... 359/110, 117, 124, 155, 359/161, 166, 167, 173, 177; 379/26, 18; 370/14; 375/10; 371/29.1, 29.5; 455/9; 340/825.07

[56] References Cited

U.S. PATENT DOCUMENTS

| | | | |
|---|---|---|---|
| 4,066,883 | 1/1978 | Wheeler | 371/29.5 |
| 4,156,110 | 5/1979 | Keeney | 370/14 |
| 4,278,850 | 7/1981 | Sato et al. | 371/22 |
| 4,750,175 | 6/1988 | Brenneman | 375/10 |
| 4,887,309 | 12/1989 | Andersson et al. | 455/601 |
| 4,899,043 | 2/1990 | Mochizuki et al. | 250/227 |
| 4,911,515 | 3/1990 | So et al. | 350/96.16 |
| 4,918,396 | 4/1990 | Halemane et al. | 330/4.3 |
| 5,066,118 | 11/1991 | Buerli | 356/73.1 |
| 5,069,544 | 12/1991 | Buerli | 356/73.1 |

FOREIGN PATENT DOCUMENTS 0182837 9/1985 Japan ........................... 371/29.1
3-258037 11/1991 Japan ............................. 359/110

Primary Examiner—Leslie Pascal
Attorney, Agent, or Firm—Robert P. Marley

[57] ABSTRACT

A performance monitoring technique which allows faults within an optical communication system to be detected and located. More specifically, a technique employing a signal generator to controllably insert maintenance signals at the input and output of each module within an optical communication system, and a single monitor to receive the inserted maintenance signals at a fixed point within the system, and, in response, determine the location of faulty modules. The monitor analyzes the received inserted maintenance signals, and locates faults by pinpointing modules from which a maintenance signal inserted at the module output is received uncorrupted by the monitor, but which return a corrupted maintenance signal when the insertion is made at the module input. A particular embodiment of the invention enables the maintenance signals to be inserted via pre-existing control drivers within system modules. This allows optical losses with the system to be minimized by eliminating the need for introduction of additional optical couplers or attenuators into the system.

36 Claims, 6 Drawing Sheets

PERFORMANCE MONITORING AND FAULT LOCATION FOR OPTICAL EQUIPMENT, SYSTEMS AND NETWORKS

TECHNICAL FIELD

The invention relates to performance monitoring, maintenance, and fault location in optical communication or data networks.

BACKGROUND OF THE INVENTION

The performance of modern optical communication equipment deployed within a communication network must be monitored in a fashion which allows failures to be detected and located quickly and reliably so that immediate measures may be taken to bring the failed equipment back on-line. This minimizes the loss of service experienced by network users, and any loss of revenue to the network provider. Ideally, this monitoring should be capable of localizing any detected faults to a particular module within the network (a module being the smallest unit within the network that can be readily replaced in the event a fault associated with it is detected). In most applications a built-in automatic fault location scheme is essential.

In general, two basic performance monitoring techniques may be employed which allow for quick detection and localization of faults within multi-module optical communication systems and networks. A first technique provides a dedicated performance monitoring system within each module. This technique typically provides the fastest fault locating ability, but requires accessing electrical or optical signals at each system module so that various fault parameters can be measured. The cost of such performance monitoring systems is very high as separate monitoring equipment must be provided for each system module. Furthermore, this type of monitoring system is very lossy. The optical signal within the system must be accessed or "tapped" at each module so that is may be measured by the monitoring equipment, and every such tap introduces optical losses.

A second technique of performance monitoring utilizes a two-level monitoring system. In this system a maintenance signal of known characteristics is either added to the primary information signal being transmitted within the optical system on the same or slightly different wavelength as the primary information signal, or alternatively modulated on the primary information signal at a signal source prior to entering the system. This maintenance signal may, for example, be added at a previous transmitter or a previous optical amplifier. A preferred method of transmitting such a signal is disclosed in co-pending U.S. patent application Ser. No. 07/499,112 now U.S. Pat. No. 5,229,876, filed Mar. 28, 1990. The first level of performance monitoring is accomplished by a dedicated monitor at the input and output ports of the communication system. When this dedicated monitor detects a performance deterioration or a failure (indicated by an anormaly in the maintenance signal), an inter-module monitor is activated and sequentially connected to the input and output of each module within the failing communication system. This sequential switching and monitoring process goes on until the faulty module is identified. The fault will be located at the module which shows the proper maintenance signal at its input, but not at its output. Obviously, this two-level technique is more cost effective than a system in which each module has its own dedicated monitor. However, this two-level technique is relatively slow in locating a fault as a consequence of the switching which must be performed to connect the inner-module monitor the different modules within the system. In addition, the communication system must still be tapped at the input and output port of each module, and these taps add significant optical losses to the system.

SUMMARY OF THE INVENTION

The aforementioned problems are solved, in accordance with the principles of the invention, by employing one or more signal generators to controllably insert maintenance signals at the input and output of each module within an optical communication system, and monitoring the output of the optical system from a fixed point within the system, via a single monitor, so as to receive the inserted maintenance signals, and, in response, determine the location of faulty modules. The monitor analyzes the received inserted maintenance signals, and locates faults by pinpointing modules at which a maintenance signal inserted at the module output is received uncorrupted by the monitor, but which return a corrupted maintenance signal when the insertion is made at the module input. The introduction of optical losses by tapping the input and output ports of each module is eliminated in a particular realization of the invention in which the maintenance signal is introduced via pre-existing control drivers within each module.

DETAILED DESCRIPTION

Figure 1:
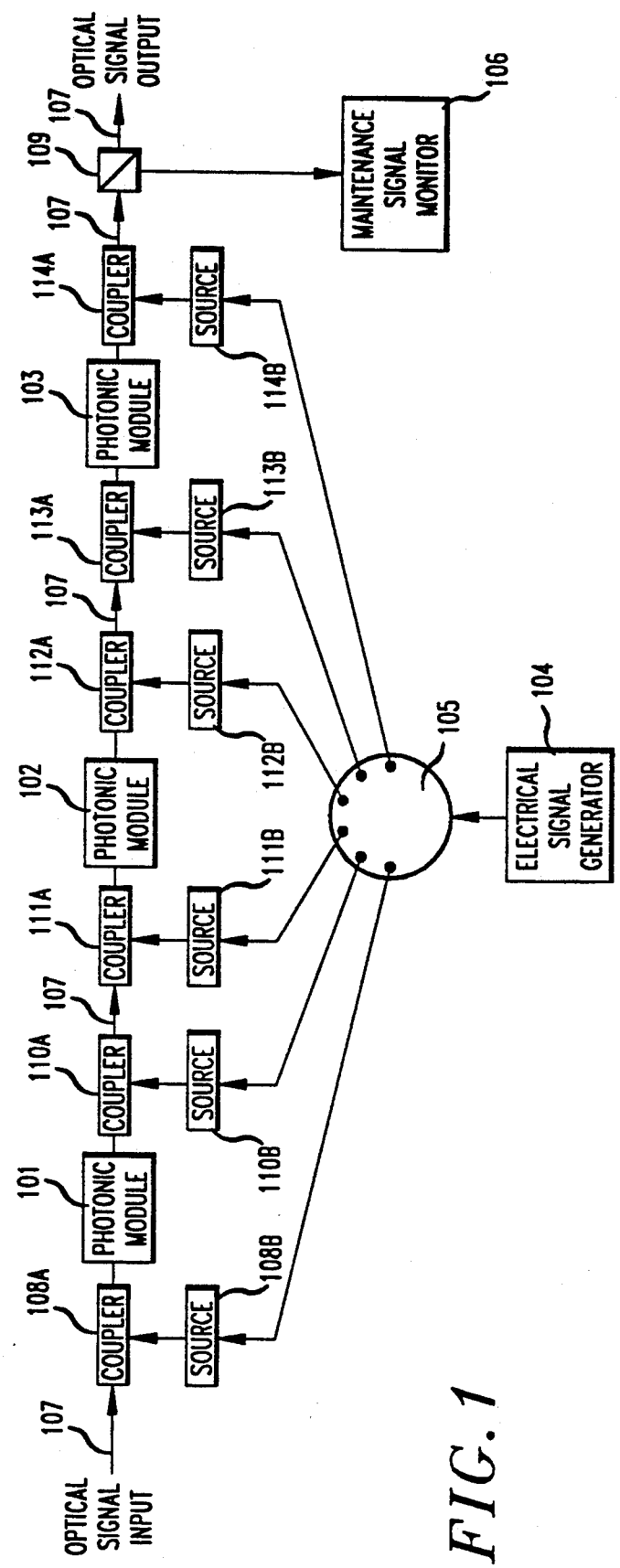
FIG. 1 shows, in simplified block diagram form, an optical communication system incorporating a particular embodiment of the invention.

FIG. 1 is a simplified block diagram showing an optical communication system incorporating a particular embodiment of this invention. As shown, three photonic modules (101, 102, and 103), electrical signal generator 104, electrical signal commutator 105, maintenance signal monitor 106, and optical transmission line 107 are included in the system. A primary information bearing optical signal is transmitted along optical transmission line 107 from input to output. In practicing the invention, a modulated analog maintenance signal is injected into the optical signal traveling along optical transmission line 107, prior to the input of photonic module 101. This modulated signal is produced by optical source 108b and injected via coupler 108a. Optical source 108b produces the modulated optical signal in response to an analog electrical signal produced by electrical signal generator 104, and directed to optical source 108b via electrical signal distributor 105. As the injected modulated optical signal propagates along optical transmission line 107 toward the optical signal output, it passes through optical tap 109. Optical tap 109 routes a portion of the modulated signal to maintenance signal monitor 106. Maintenance signal monitor 106 analyzes the received optical signal and determines if the modulated signal injected at coupler 108a has been successfully transmitted through the optical communication system.

Another encoded maintenance signal is then injected by coupler 110a into the primary optical signal traveling along optical transmission line 107 following the output of photonic module 101. This maintenance signal is generated by optical source 110b in response to an analog electrical signal produced by electrical signal generator 104, and directed to optical source 110b via electrical signal distributor 105. The resultant modulated optical signal propagates along optical transmission line 107 toward the optical signal output. As the modulated signal passes through optical tap 109, a portion of the signal is routed to maintenance signal monitor 106. Maintenance signal monitor 106 analyzes the received optical signal and determines if the modulated signal introduced at coupler 110a has been successfully transmitted through the optical communication system.

If maintenance signal monitor 106 successfully receives the maintenance signals introduced at both coupler 108a and coupler 110b, photonic module 101 is assumed to be operating properly. If, however, maintenance signal monitor 106 receives the signal injected at coupler 110a, but fails to receive the signal injected at coupler 108a, photonic module 101 would be considered faulty.

The above described testing procedure can be applied to photonic modules 102 and 103 (employing optical sources/couplers 111a/b and 112a/b for photonic module 102, and optical sources/couplers 113a/b and 114a/b for photonic module 103), so as to determine if these modules are faulty. The same procedure can be used to check the integrity of optical transmission line 107 as well (by employing coupler/source pairs 110a/b, 111a/b, 112a/b, 113a/b, and 114a/b). The electrical signal provided to a particular optical source by electrical signal generator 104 may be modulated in a manner which distinguishes that source from all others attached to the optical communication system. This may be accomplished by pre-programming electrical signal generator 104 to employ a unique modulation pattern or frequency for each of the sources within the communication system.

Figure 2:
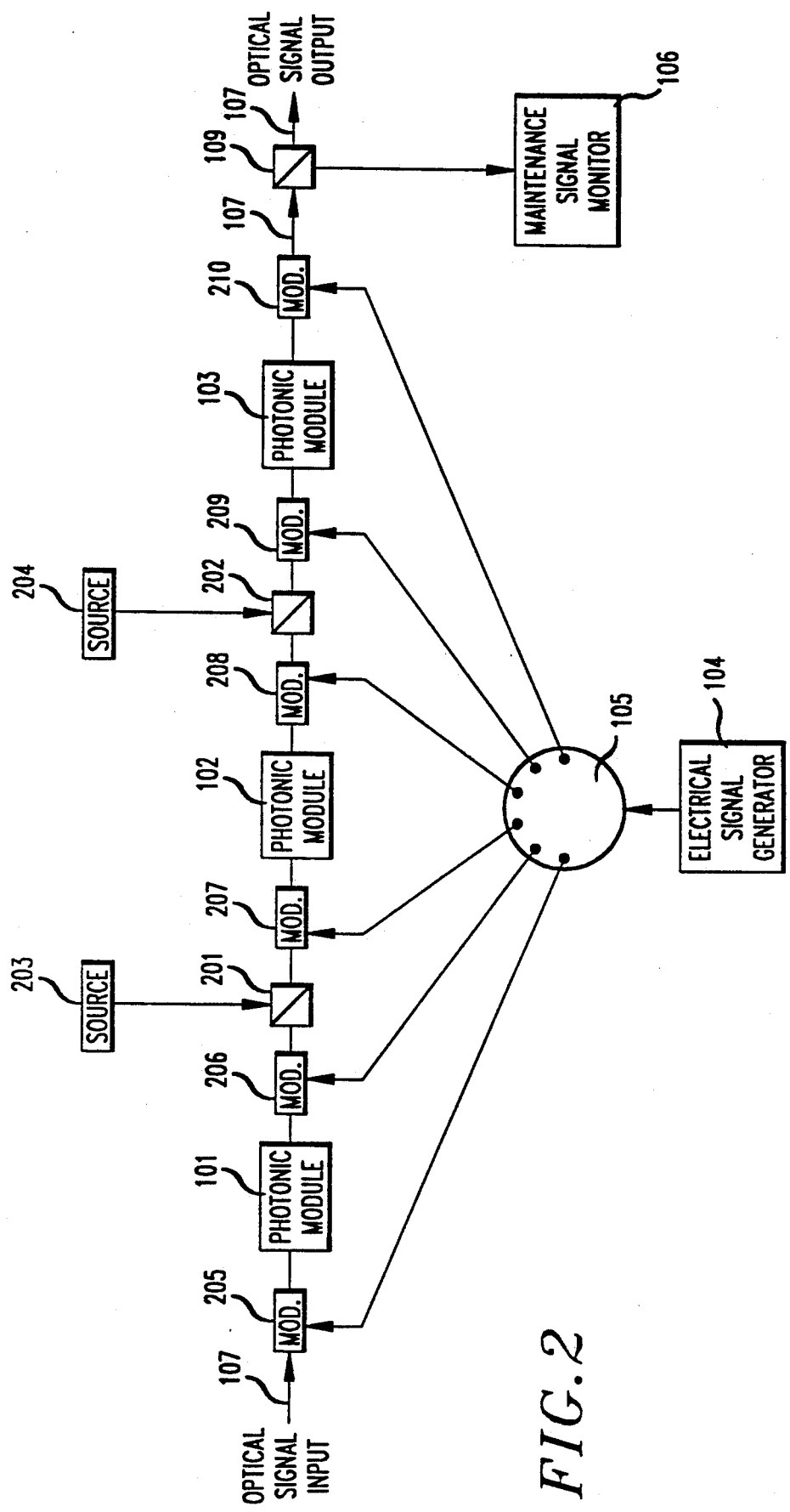
FIG. 2 shows, in simplified block diagram form, an optical communication system incorporating a second embodiment of the invention.

FIG. 2 is a simplified block diagram showing an optical communication system incorporating a particular embodiment of this invention. As shown, three photonic modules (101, 102, and 103), two optical couplers (201, and 202), two inter-module optical light sources (203 and 204), electrical signal generator 104, electrical signal distributor 105, maintenance signal monitor 106, and optical transmission line 107 are included in the system. A primary information bearing optical signal is transmitted along optical transmission line 107 from input to output. In practicing the invention, a maintenance signal is modulated onto the optical signal traveling along optical transmission line 107, prior to the input of photonic module 101. This optical modulation is accomplished by optical modulator 205 which controllably attenuates or amplifies the primary information bearing signal traveling along transmission line 107. Optical modulator 205 is controlled by an electrical signal which is produced by electrical signal generator 104, and directed to optical modulator 205 via electrical signal distributor 105. As the modulated optical signal propagates along optical transmission line 107 toward the optical signal output, it passes through optical tap 109. Optical tap 109 routes a portion of the modulated signal to maintenance signal monitor 106. Maintenance signal monitor 106 analyzes the received optical signal and determines if the modulated signal introduced at optical modulator 205 has been successfully transmitted through the optical communication system.

Another encoded maintenance signal is then modulated by optical modulator 206 onto the optical signal traveling along optical transmission line 107 following the output of photonic module 101. This maintenance signal is generated in response to an analog electrical signal produced by electrical signal generator 104, and directed to optical modulator 206 via electrical signal distributor 105. The resultant modulated optical signal propagates along optical transmission line 107 toward the optical signal output. As the modulated signal passes through optical tap 109, a portion of the signal is routed to maintenance signal monitor 106. Maintenance signal monitor 106 analyzes the received optical signal and determines if the modulated signal introduced at optical modulator 206 has been successfully transmitted through the optical communication system.

If maintenance signal monitor 106 successfully receives the maintenance signals introduced at both optical modulator 205 and optical modulator 206, photonic module 101 is assumed to be operating properly. If, however, maintenance signal monitor 106 receives the modulated signal introduced at optical modulator 206, but fails to receive the modulated signal introduced at optical modulator 205, photonic module 101 would be considered faulty.

By employing optical modulators 207, 208, 209 and 210 the above described testing procedure can be applied to photonic modules 102 and 103 so as to determine if these modules are faulty. The electrical signal provided to a particular optical modulator by electrical signal generator 104 may be modulated in a manner which distinguishes that optical modulator from all others attached to the optical communication system. This may be accomplished by pre-programming electrical signal generator 104 to employ a unique modulation pattern or encoded frequency for each of the optical modulators within the communication system.

In the event of a severe line fault which prohibited the optical input signal from propagating to maintenance monitor 106, inter-module light sources 203 and 204 can be employed to aid in locating the fault. Upon determination that maintenance monitor 106 was not receiving the optical input signal, light from inter-module light source 203 is injected into transmission line 107 via optical coupler 201. A maintenance signal is then modulated onto this injected light by modulator 207. If maintenance signal monitor 106 successfully receives the maintenance signal introduced by modulator 207, the fault can be assumed to be located in a portion of transmission line 107 prior to optical coupler 201, or within photonic module 101 or modulators 205 or 206. If the light injected by inter-module optical source 203 fails to propagate to maintenance monitor 106, light is injected at optical coupler 202 by inter-module light source 204. Modulator 209 modulates a maintenance signal onto this injected light. If maintenance signal monitor 106 successfully receives this maintenance signal, the fault is assumed to be in a portion of the communication system located between optical couplers 201 and 202. If the light injected at optical coupler 202 fails to propagate to maintenance monitor 106, the fault is located between coupler 202 and optical tap 109.

Figure 3:
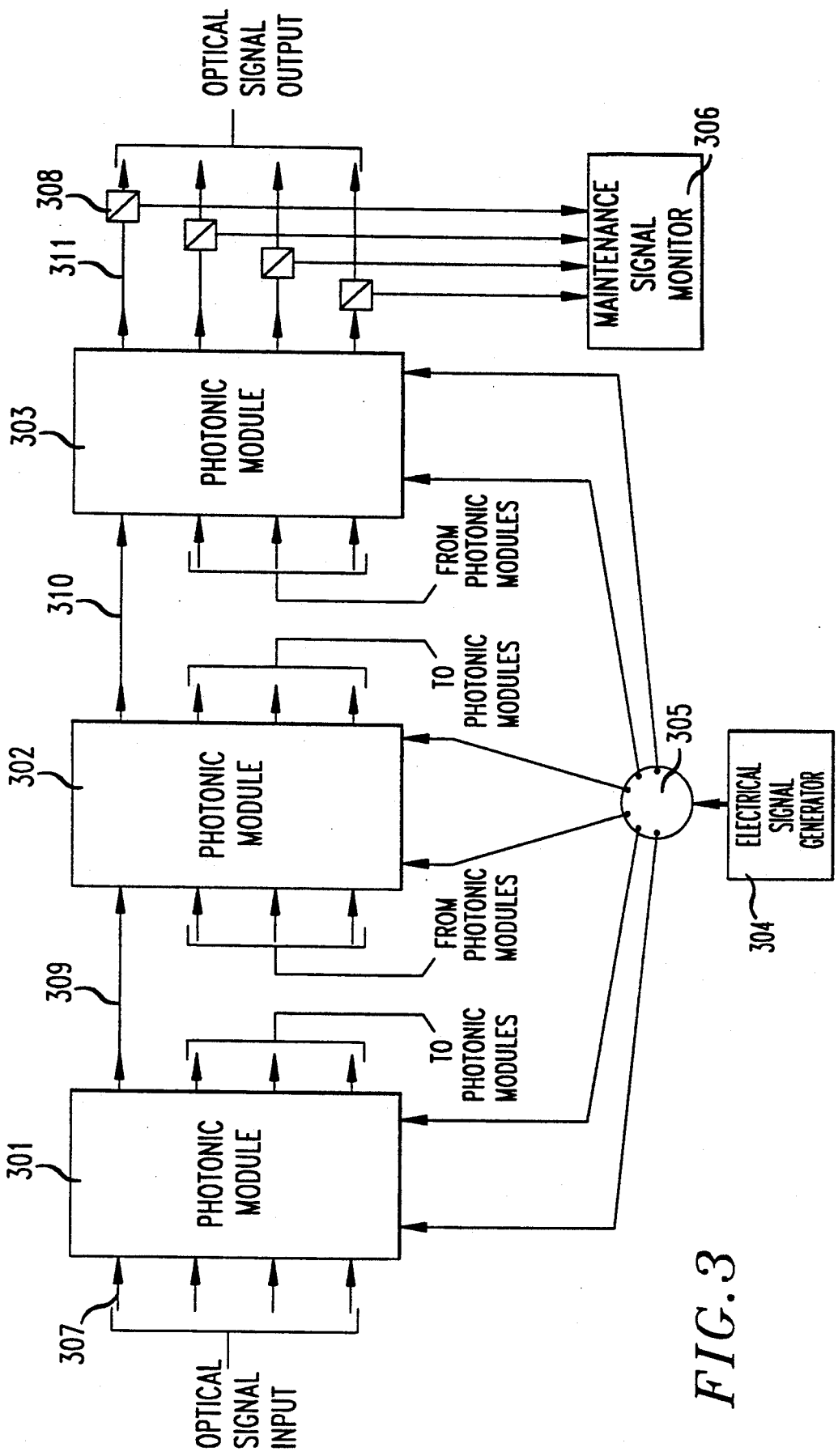
FIG. 3 shows, in simplified block diagram form, an optical communication system incorporating a third embodiment of the invention.

Another preferred technique of practicing the invention is facilitated by the communications system shown in FIG. 3. As shown, three photonic modules (301, 302, and 303), electrical signal generator 304, electrical signal distributor 305, maintenance signal monitor 306, and optical transmission paths 307, 309, 310, and 311 are included in the system. Primary information bearing optical signals travel along these optical transmission paths from input to output. The photonic modules within this system are each opto-electronic integrated guided-wave switching devices of the type shown in FIG. 4. The optical switching within such guided-wave devices is controlled by the applying voltages to control electrodes internal to the devices. Such switching devices (e.g., directional couplers) are typically fabricated from lithium-niobate, and are well known in the art.

Figure 4:
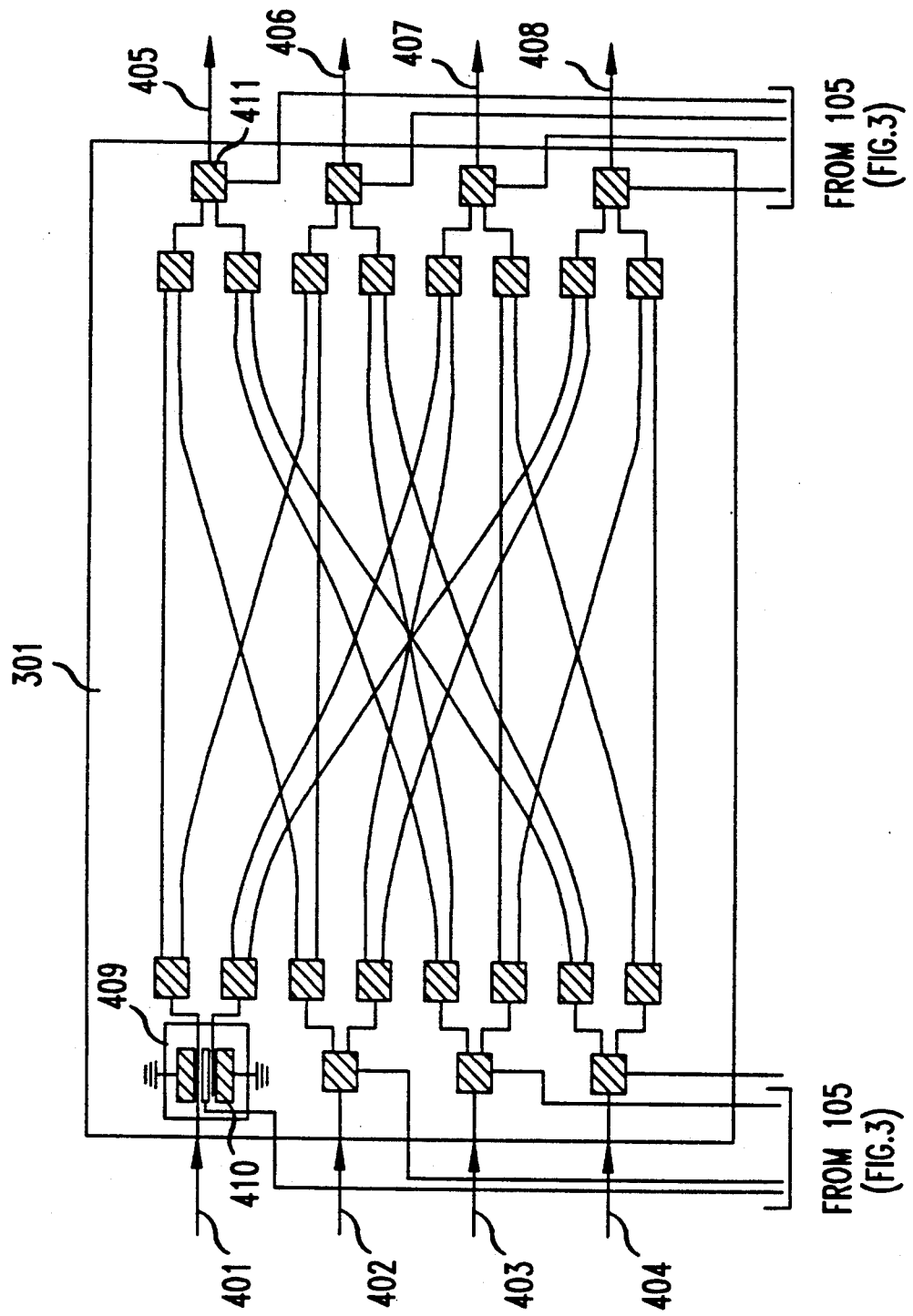
FIG. 4 shows, in simplified form, the internal architecture of one of the photonic modules of FIG. 3.

FIG. 4 shows, in simplified form, the internal architecture of photonic module 301 of FIG. 3. Photonic module 301 (a 4×4 switch) accepts optical input signals from optical transmission paths via input lines 401, 402, 403, and 404, and outputs optical signals via lines 405-408. Transmission path 307 is connected to photonic module 301 via input line 401. A switch point having a control electrode is associated with each of the input and output lines in photonic module 301. Additional control electrodes are also associated with the sixteen intermediate optical switch points within photonic module 301. A detailed depiction of switch point 409 (which is associated with input line 401) is shown in FIG. 4. A voltage applied to electrode 410 regulates the transmission of optical signals through switch point 409. The transmission of optical signals at each input and output can be similarly regulated by applying a voltage to the associated control electrode. Each of the control electrodes associated with an input or output line within photonic module 301 is connected to electrical signal generator 304 via electrical signal distributor 305. Photonic modules 302 and 303 are each configured similarly, and the control electrodes associated with the input and output lines of these photonic modules are similarly connected to electrical signal generator 304.

In practicing the invention within the optical communication system of FIG. 3, an encoded maintenance signal is modulated onto the optical signals traveling along optical transmission path 307 at the input of photonic module 301. This optical modulation is accomplished by transmitting modulated voltages to control electrode 410 (FIG. 4) from electrical signal generator 304 (FIG. 3). In response to these modulated voltages, control electrode 410 causes the optical signal being transmitted along path 307, and entering photonic module 301 via input line 401 to be modulated. The switch points within photonic module 301 are biased to allow the modulated optical signal to exit photonic module 301 at output line 405. The modulated signal propagates along optical transmission path 309. The switch points within photonic module 302 and photonic module 303 are biased so that the modulated signal on transmission path 309 is propagated to transmission lines 310 and 311, and optical tap 308. Optical tap 308 routes a portion of the modulated signal to maintenance signal monitor 306. Maintenance signal monitor 306 analyzes the received optical signal and determines if the modulated signal introduced at the input of photonic module 301 has been successfully transmitted through the optical communication system.

Another encoded maintenance signal is then modulated onto the optical signals traveling along optical transmission path 307 at switch point 411 (FIG. 4) of photonic module 301. This optical modulation performed in response to a modulated voltage produced by electrical signal generator 304, and directed to the control electrode within switch point 411. This control electrode receives the modulated voltage from electrical signal generator 304 via electrical signal distributor 305. The resultant modulated optical signal exits photonic module 301 via line 405, propagates along optical transmission path 309. Switch points within photonic modules 302 and 303 are biased so as to facilitate the transmission of the modulated optical signal along transmission paths 310 and 311 to optical tap 308. As the modulated signal passes through optical tap 308, a portion the signal is routed to maintenance signal monitor 306. Maintenance signal monitor 306 analyzes the received optical signal and determines if the modulated signal introduced at the output of photonic module 301 has been successfully transmitted through the optical communication system.

If maintenance signal monitor 306 successfully receives the maintenance signal introduced at both input 401 and output 405 of photonic module 301, then the paths within photonic modules 301, 302, and 303 traversed by the maintenance signal are assumed to be performing properly. If, however, maintenance signal monitor 306 receives the modulated signals originating at the output of photonic module 301, but fails to receive the modulated signals originating at the input of photonic module 301, the path within photonic module 301 would be considered faulty. Alternatively, if maintenance signal monitor 306 fails to receive both the modulated signal originating at the input and the output of photonic module 301, fault is assumed to be "downstream" (i.e., within photonic modules 302 and 303).

The above described testing procedure can be applied to various pathways within photonic module 301 so that each possible pathway through the module may be evaluated. In addition, the overall procedure can be repeated for photonic modules 302 and 303 so as to determine if the various pathways within either of these modules are faulty. The input and output lines of each of the photonic modules shown in FIG. 3 may be selectively connected to other photonic modules using known switching and control techniques to allow all possible pathways between the modules to be evaluated. As is shown in FIG. 3, an optical tap is provided for each output line of photonic module 303 so that each of these output lines may be monitored by maintenance signal monitor 306.

The electrical signal provided to a particular control electrode within any of the photonic modules shown in FIG. 3 may be modulated in a manner which distinguishes that particular control module from all others within the optical communication system. This may be accomplished by pre-programming electrical signal generator 304 to employ a unique modulation pattern or frequency for each of the modulators within the communication system.

By employing the pre-existing control electrodes within the opto-electronic integrated guided-wave switching devices to perform the maintenance signal modulation, the need for external attenuators or modulators is eliminated. This reduces the cost of implementing such a performance monitoring system, and removes a significant source of optical signal losses. The application and practice of the invention with respect to opto-electronic integrated guided-wave switching devices is not limited to those fabricated from lithium-niobate. It may be practiced with switching devices fabricated from indium-phosphide, as well as other types of guided-wave switching devices. In addition, the invention may also be applied to free-space optical switching devices by directing the modulated voltages produced by the electrical signal generator to the control mechanisms contained within these switching devices. Furthermore, the particular configuration and complexity of the opto-electronic integrated guided-wave switching devices with which this invention is practiced is immaterial, as long as a control electrode or mechanism is provided for each optical line entering and exiting the device. Note that in the above described example there is no need to transmit a modulated voltage to the control electrodes associated with the sixteen intermediate optical switch points within photonic module 301.

Figure 5:
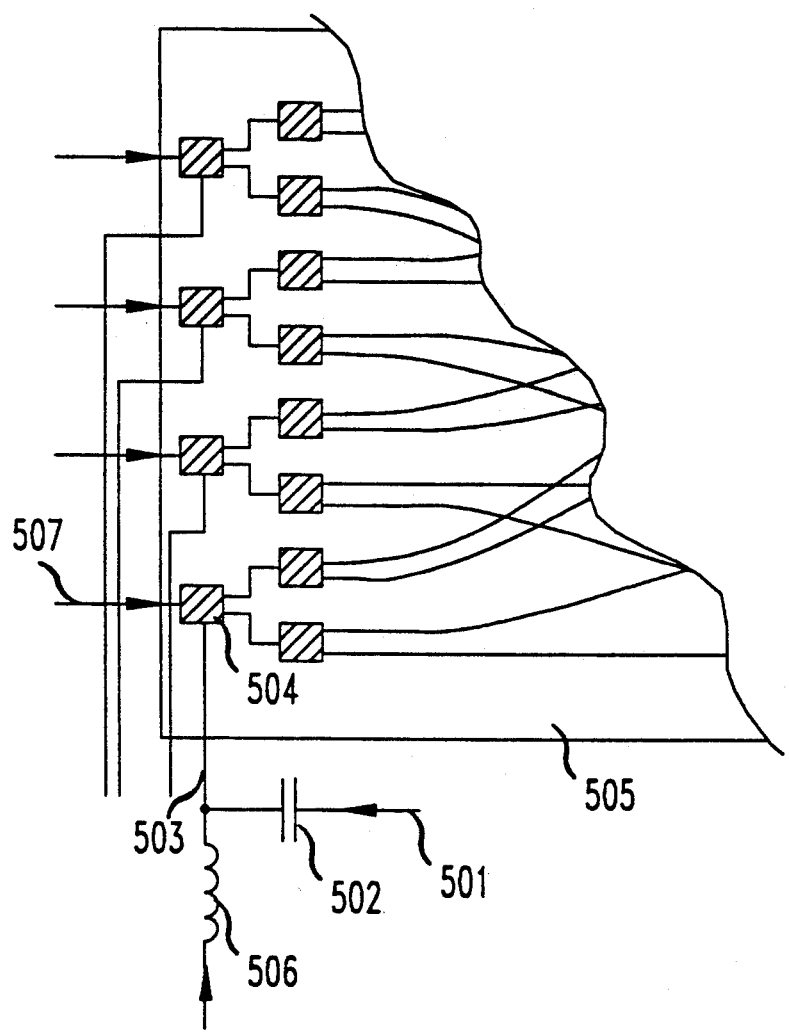
FIG. 5 shows, in simplified form, a scheme for coupling a signal intended to modulate a maintenance signal to a control electrode within an opto-electronic integrated wave-guide photonic module.

One scheme for coupling a signal intended to modulate a maintenance signal to a control electrode within a photonic module is shown in FIG. 5. The signal (such as one generated by electrical signal generator 304) is input on line 501 and capacitively coupled via capacitor 502 to switching control line 503. Switching control line 503 is connected to control electrode 504 within photonic module 505, and serves to carry signals (received via inductor 506) which control optical switching on line 507. This arrangement permits one connection to carry the signals which control switching and maintenance signal modulation simultaneously.

Figure 6:
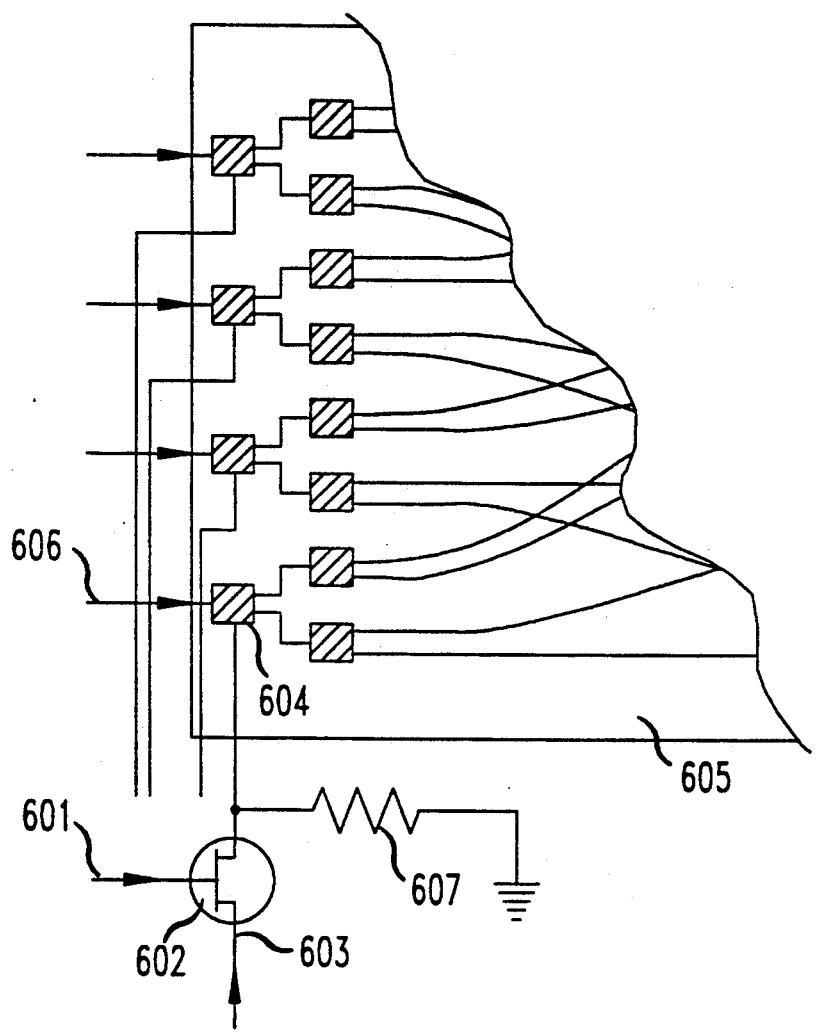
FIG. 6 shows, in simplified form, an alternate scheme for coupling a signal intended to modulate a maintenance signal to a control electrode within an opto-electronic integrated wave-guide photonic module.

An alternate scheme for coupling a maintenance modulation signal to a control electrode within a photonic module is shown in FIG. 6. The signal (such as one generated by electrical signal generator 304) is input on line 601 to the gate of FET 602. Switching control line 603 is connected, via the channel of FET 602, to control electrode 604 within photonic module 605, and serves to carry signals (received from a switch controller) which regulate switching on line 606. Resistor 607 serves to provide a path to ground so that absent a signal from the switch controller or input line 601, the potential across control electrode 604 is essentially zero. Only one connection is needed to carry the signals controlling both switching and maintenance signal modulation.

In any of the above described embodiments the modulated maintenance signals may be encoded to carry such information as input/output port identity, module identity, circuit pack identity, as well as a test pattern designed test specific transmission characteristics of particular photonic modules and/or transmission paths. The modulated signals could also carry information related to factors effecting the general performance of the modules within the communication system (i.e., ambient temperature at any given module). The modulation employed may be any type (e.g., amplitude shift keying, frequency shift keying, phase shift keying, etc.), and the sub-carrier frequency may be any within practical limits.

The above-described invention provides a practical performance monitoring technique which allows faults within an optical communication system to be detected and located. It will be understood that the particular methods described are only illustrative of the principles of the present invention, and that various modifications could be made by those skilled in the art without departing from the scope and spirit of the present invention, which is limited only by the claims that follow.

One such modification would include generating the analog electrical signals provided to the optical sources and modulators in the above described examples at a plurality of individual electrical signal generators; each of these generators being dedicated to a particular photonic module, photonic module port, or group of photonic module ports.

We claim:

1. A method for monitoring the performance of a modular optical system wherein a primary optical signal is transmitted through a plurality of modules within the system via an optical path, comprising the steps of:

inserting, in response to an electrical signal generated at a signal source, a first maintenance signal into the optical path of said system at the input of each of said plurality of modules;

monitoring the optical path of said system at a fixed point to detect each of said inserted first maintenance signals;

inserting, in response to an electrical signal generated at a signal source, a second maintenance signal into the optical path of said system at the output of each of said plurality of modules;

monitoring the optical path of said system at said fixed point to detect each of said inserted second maintenance signals; and determining the performance of each of said plurality of modules based upon the detection of said first and second maintenance signals at said fixed point.

2. The method of claim 1 wherein said first and second inserted maintenance signals are inserted in response to electrical signals generated at a common signal source.

3. The method of claim 1 wherein said first and second inserted maintenance signals contain information indicating the particular input or output module port at which they were inserted.

4. The method of claim 1 wherein said first and second inserted maintenance signals contain information indicating the identity of the module at which they were inserted.

5. A method for monitoring the performance of a modular optical system wherein a primary optical signal is transmitted through a plurality of modules within the system via an optical path, comprising the steps of:

modulating, in response to an electrical signal generated at a signal source, said primary optical signal at the input of each of said plurality of modules so as to create a first maintenance signal;

monitoring the optical path of said system at a fixed point to detect each of said first maintenance signals;

modulating, in response to an electrical signal generated at a signal source, said primary optical signal at the output of each of said plurality of modules so as to create a second maintenance signal;

monitoring the optical path of said system said fixed point to detect each of said second maintenance signals; and determining the performance of each of said plurality of modules based upon the detection of said first and second maintenance signals at said fixed point.

6. The method of claim 5 wherein said first and second inserted maintenance signals are modulated in response to electrical signals generated at a common signal source.

7. The method of claim 5 wherein said first and second modulated maintenance signals contain information indicating the identity of the module at which they were modulated.

8. The method of claim 5 wherein said first and second modulated maintenance signals contain information indicating the particular input or output module port at which they were modulated.

9. The method of claim 5 wherein said first and second maintenance signals are amplitude modulated.

10. The method of claim 5 wherein said first and second maintenance signals are frequency modulated.

11. The method of claim 5 wherein said first and second maintenance signals are phase modulated.

12. A method for monitoring the performance of a modular optical system wherein a primary optical signal is transmitted through a plurality of opto-electronic guided-wave modules within the system via an optical path, comprising the steps of:

modulating, in response to an electrical signal generated at a signal source, said primary optical signal at the input of each of said plurality of modules so as to create a first maintenance signal;

monitoring the optical path of said system at a fixed point to detect each of said first maintenance signals;

modulating, in response to an electrical signal generated at a signal source, said primary optical signal at the output of each of said plurality of modules so as to create a second maintenance signal;

monitoring the optical path of said system said fixed point to detect each of said second maintenance signals; and determining the performance of each of said plurality of modules based upon the detection of said first and second maintenance signals at said fixed point.

13. The method of claim 12 wherein said first and second inserted maintenance signals are modulated in response to electrical signals generated at a common signal source.

14. The method of claim 12 wherein said first and second modulated maintenance signals contain information indicating the identity of the module at which they were modulated.

15. The method of claim 12 wherein said first and second modulated maintenance signals contain information indicating the particular input or output module port at which they were modulated.

16. The method of claim 12 wherein said first and second maintenance signals are amplitude modulated.

17. The method of claim 12 wherein said first and second maintenance signals are frequency modulated.

18. The method of claim 12 wherein said first and second maintenance signals are phase modulated.

19. Apparatus for monitoring the performance of a modular optical system wherein a primary optical signal is transmitted through a plurality of modules within the system via an optical path, comprising:

means for inserting, in response to an electrical signal generated at a signal source, a first maintenance signal into the optical path of said system at the input of each of said plurality of modules;

means for monitoring the optical path of said system at a fixed point to detect each of said inserted first maintenance signals;

means for inserting, in response to an electrical signal generated at a signal source, a second maintenance signal into the optical path of said system at the output of each of said plurality of modules;

means for monitoring the optical path of said system said fixed point to detect each of said inserted second maintenance signals; and means responsive to said detection of said first and second maintenance signals for determining the performance of each of said plurality of modules.

20. The invention of claim 19 wherein said first and second inserted maintenance signals are inserted response to electrical signals generated at a common signal source.

21. The invention of claim 19 wherein said first and second maintenance signals contain information indicating the identity of the module at which they were inserted.

22. The invention of claim 19 wherein said first and second maintenance signals contain information indicating the particular input or output module port at which they were inserted.

23. Apparatus for monitoring the performance of a modular optical system wherein a primary optical signal is transmitted through a plurality of modules within the system via an optical path, comprising:

means for modulating, in response to an electrical signal generated at a signal source, said primary optical signal at the input of each of said plurality of modules so as to create a first maintenance signal;

means for monitoring the optical path of said system at a fixed point to detect each of said first maintenance signals;

means for modulating, in response to an electrical signal generated at a signal source, said primary optical signal at the output of each of said plurality of modules so as to create a second maintenance signal;

means for monitoring the optical path of said system at said fixed point to detect each of said plurality of said second maintenance signals; and means responsive to said detection of said first and second maintenance signals for determining the performance of each of said plurality of modules.

24. The invention of claim 23 wherein said first and second inserted maintenance signals are modulated response to electrical signals generated at a common signal source.

25. The invention of claim 23 wherein said first and second modulated maintenance signals are modulated to contain information indicating the identity of the module at which they were modulated.

26. The invention of claim 23 wherein said first and second modulated maintenance signals are modulated to contain information indicating the particular input or output module port at which they were modulated.

27. The invention of claim 23 wherein said first and second maintenance signals are amplitude modulated.

28. The invention of claim 23 wherein said first and second maintenance signals are frequency modulated.

29. The invention of claim 23 wherein said first and second maintenance signals are phase modulated.

30. Apparatus for monitoring the performance of a modular optical system wherein a primary optical signal is transmitted through a plurality of opto-electronic guided-wave modules within the system via an optical path, comprising:

means internal to each of said plurality of opto-electronic guided-wave modules for modulating, in response to an electrical signal generated at a signal source, said primary optical signal at the input of each of said plurality of opto-electronic guided-wave modules so as to create a first maintenance signal;

means for monitoring the optical path of said system at a fixed point to detect each of said first maintenance signals;

means internal to each of said plurality of opto-electronic guided-wave modules for modulating, in response to an electrical signal generated at a signal source, said primary optical signal at the output of each of said plurality of opto-electronic guided-wave modules so as to create a second maintenance signal;

means for monitoring the optical path of said system at said fixed point to detect each of said second maintenance signals; and means responsive to said detection of said first and second maintenance signals for determining the performance of each of said plurality of opto-electronic guided-wave modules.

31. The invention of claim 30 wherein said first and second inserted maintenance signals are modulated response to electrical signals generated at a common signal source.

32. The invention of claim 30 wherein said first and second modulated maintenance signals are modulated to contain information indicating the identity of the opto-electronic guided-wave module at which they were modulated.

33. The invention of claim 30 wherein said first and second modulated maintenance signals are modulated to contain information indicating the particular input or output opto-electronic guided-wave module port at which they were modulated.

34. The invention of claim 30 wherein said first and second maintenance signals are amplitude modulated.

35. The invention of claim 30 wherein said first and second maintenance signals are frequency modulated.

36. The invention of claim 30 wherein said first and second maintenance signals are phase modulated.

* * * * *